United States Patent [19]
Lubowitz

[11] 3,853,815
[45] Dec. 10, 1974

[54] THERMOSETTING CYCLIZED POLYDIENE RESINS

[75] Inventor: Hyman R. Lubowitz, Hawthorne, Calif.

[73] Assignee: TRW Inc., Redondo Beach, Calif.

[22] Filed: May 2, 1973

[21] Appl. No.: 356,705

Related U.S. Application Data

[63] Continuation-in-part of Ser. No. 64,611, Aug. 7, 1970, abandoned.

[52] U.S. Cl. ........... 260/63 R, 117/124 E, 161/195, 260/40 R, 260/41 A, 260/41 B, 260/47 C, 260/47 CZ, 260/47 CP, 260/63 N, 260/65, 260/75 UA, 260/75 EP, 260/78 UA, 260/79.7, 260/835, 260/836, 260/857

[51] Int. Cl. ..................... C08g 17/003, C08g 17/10

[58] Field of Search ...... 260/78 UA, 75 UA, 75 EP, 260/836, 835, 47 C, 79.7, 47 CZ, 47 CP, 63 R, 63 N, 857, 65

[56] References Cited
UNITED STATES PATENTS

| | | | |
|---|---|---|---|
| 3,427,366 | 2/1969 | Verdol et al. | 260/859 |
| 3,515,772 | 6/1970 | Lubowitz et al. | 260/836 |
| 3,528,878 | 9/1970 | Lubowitz et al. | 161/188 |

*Primary Examiner*—Lester L. Lee
*Attorney, Agent, or Firm*—Daniel T. Anderson; Alan D. Akers; Willie Krawitz

[57] ABSTRACT

A hydroxy, amino, or mercapto terminated polydiene polymer is reacted with an organic acid anhydride to produce a carboxylic acid terminated polydiene. An organic chain extender and a peroxide free radical initiator is mixed with the polydiene, and upon reaction, an elastomeric material having the peroxide homogeneously dispersed therethrough substantially unreacted is formed. When the temperature is raised, the peroxide in the elastomer effects a cure to produce a hard thermoset resin.

15 Claims, No Drawings

THERMOSETTING CYCLIZED POLYDIENE RESINS

This application is a continuation-in-part of Ser. No. 64,611, filed Aug. 7, 1970 and now abandoned.

BACKGROUND OF THE INVENTION

Because of their excellent chemical stability and good physical properties, thermoset polydiene resins have been of considerable interest for several years. U.S. Pat. No. 2,586,594 taught that a tough, chemically stable resin coating could be applied to a substrate by the application of the liquid polybutadiene and the subsequent peroxide cure. While this system offered the benefit of good physical and chemical properties, the liquid polybutadiene required specialized and skillful handling techniques. Further development improved this system, but the handling and workability problems were never completely overcome. More recently, U.S. Pat. No. 3,431,235 offered a solution to the problems of workability and handling by the formation of an intermediate elastomeric material which may be handled and worked without special equipment and requirements. Thus, the polymer compounder who is equipped to handle viscous and tacky material, formulates a resin composition according to the fabricators' specifications and cures the material to an intermediate elastomeric stage. The fabricator then produces the final product without the necessity of special equipment to handle viscous, tacky polymeric materials. While U.S. Pat. No. 3,431,235 taught the solution to many problems associated with thermoset polydiene resins, the thermoset polydiene resins still possessed shrinkage, machinability, and adhesion problems.

SUMMARY OF THE INVENTION

The present invention substantially diminishes the shrinkage, machinability, and adhesion problem associated with the peroxide cure of the polydiene resins. This is achieved by reacting a functionally terminated polydiene, such as 1,2-polybutadienediol or 3,4-polyisoprenediol, with an organic acid anhydride to produce a dicarboxylic acid terminated polydiene. The carboxylic acid terminated polydiene is mixed with an organic chain extender and a peroxide free radical initiator which, upon reaction produces an elastomeric material having the peroxide homogeneously dispersed therethrough substantially unreacted. By raising the temperature of the elastomer the peroxide in the elastomer is activated producing a hard thermoset resin. Furthermore, the elastomer and the hard state can be formed simultaneously by one heating step. The polydiene polymer used in the production of the thermosetting resin of this invention should have a predominant amount of the olefinic unsaturation comprising the 1,2-or pendant vinyl group configuration and preferably the olefinic unsaturation should comprise at least 80% of the pendant vinyl groups or the 1,2-configuration of 1,2-polybutadiene or 3,4-polyisoprene. These polydienes are prepared by anionic polymerization of butadiene or isoprene using an alkyl metal catalyst dispersion in a polar solvent, such as tetrahydrofuran or 1,2-dimethoxyethane. The polymer may be reacted with a suitable organic oxide, such as ethylene oxide, or with an organic sulfide, such as ethylene sulfide, and subsequently acidified to provide chemically functional hydroxyl or mercapto terminal groups on the polydiene polymer. U.S. Pat. Nos. 3,055,952; 3,135,716; and 3,048568 give detailed disclosures for the preparation of these functionally terminated polymers. Alternatively the high vinyl polydienes may be terminated with amino groups. Ethyl U.S. Pat. No. 3,109,871 discloses details of the preparation of amine terminated polybutadiene. While the molecular weights of these materials do not present a critical consideration, it is preferred that the molecular weight of the terminated polydiene range from approximately 500 – 5,000, however, with proper process adjustments higher molecular weights may be used.

DESCRIPTION OF THE PREFERRED EMBODIMENTS

To prepare the carboxylic acid terminated polydiene adduct, a ratio of one equivalent weight of the functionally terminated polydiene is reacted with one mole of an organic anhydride at moderate temperatures. Although the polydiene and anhydride will react at room temperature, temperatures of approximately 150° to 225° F reduce the viscosity of the polydiene and expedite the mixing and reaction of the polydiene with the anhydride.

Typical organic anhydrides which may be reacted with the difunctional polydiene include:

TABLE I

| | |
|---|---|
| trimellitic anhydride | pimelic anhydride |
| hexahydrophthalic anhydride | tetrahydrophthalic anhydride |
| nadic anhydride | chlorendic anhydride |
| methyl nadic anhydride | maleic anhydride |
| oxalic anhydride | succinic anhydride |
| malonic anhydride | suberic anhydride |
| azelaic anhydride | sebacic anhydride |
| adipic anhydride | glutaric anhydride |
| phthalic anhydride | |

In another method, one equivalent weight of the terminally difunctional polydiene may be reacted with a controlled amount of an organic dianhydride to produce a polycarboxylic acid adduct. In this reaction, it is desirable to employ an equivalent amount of the dianhydride for the formation of polycarboxylic acid adduct, however, an amount of dianhydride in excess of equivalence may be used when adducts having reduced viscosities are sought. Typical dianhydrides which are suitable for use are:

TABLE II 1. 3,3', 4,4'-benzophenone tetracarboxylic dianhydride
2. polyacelaic polyanhydride
3. pyromellitic dianhydride
4. pyromellitic dianhydride-glycol adducts
5. 1,2,3,4-cyclopentanetetracarboxylic dianhydride Acid adduct formation in the present invention is important for the purpose of increasing versatility of the polybutadiene. By end capping the polybutadiene with an anhydride, such as trimellitic anhydride, the functionality of the polybutadiene may be easily changed from 2 to 4. Another advantage of the end cap acid adduct is that the acid strength may be changed according to the type of anhydride used. Thus, rather than being limited to an aliphatic carboxylic group as when dicarboxylic 1,2-polybutadiene is used, the polybutadiene may be end capped with an aromatic carboxylic acid group, displaying different acid strengths. The advantage lies in the fact that increased acid strengths will cause the chain extension reaction to occur more rapidly which will reduce processing time.

The chain extended elastomeric intermediate is formed by the reaction of a ratio of one equivalent weight of the dicarboxylic acid adduct with one equivalent weight of an organic chain extender. The adduct and the chain extender are mixed together and reacted at temperatures ranging from 125°–250°F. As in the previous step the higher temperature reduces the viscosity of the adduct and permits better mixing. Upon completion of the mixing, the temperature is maintained for five minutes to several hours depending upon the presence of catalyst, the temperature of the polymer, the mass of the material being chain extended, and the degree of the chain extending desired.

Chain extension primarily serves to tie the carboxylic acid adduct end capped polybutadiene molecules together. In this way, the relatively low molecular weight polybutadienes may be formed into a very high molecular weight material, and thus, a fluid castable resin may be formed into an elastomeric solid. The chain extension reaction occurs through certain specified preferred functional substituents. Although the chain extenders may contain more than two substituents which are heterogeneous, it is preferred that the substituents comprise two homogeneous groups for the simplification of the reaction. The primary requirement of the functional substituents on the chain extender is that they are reactive with the carboxylic acid group on the polybutadiene adduct end cap.

Chain extending of the dicarboxylic acid adduct to form an elastomeric material is achieved by the reaction of the adduct with an aliphatic or aromatic compound having reactive diepoxide, diamine, diimine, diimide, diol, diaziridine, or dimercaptan substituent groups. While diepoxides, diimines, and diaziridines are preferred for their ease of reaction, the other compounds will react to chain extend, however, the reacting conditions will be more severe. The chain extension using the preferred compounds is accomplished by mixing the ingredients under relatively moderate conditions. Chain extension can occur at room temperature, however, the time required for the step is materially reduced by increasing the temperature to a range of approximately 125° to 250°F. The chain extension reaction may be further accelerated, or the chain extension of the diamine, the diol, or the dimercaptan compounds may be assisted by the inclusion of catalysts.

All of the chain extenders suitable for this invention can be either aromatic or aliphatic. Polymers made with aromatic chain extenders generally exhibit better thermal stability than polymers made with aliphatic chain extenders, however, because the chain extender comprises such a small percentage of the polymer structure, the differences between aromatic and aliphatic properties are frequently negligible. In additon, the chain extenders must be at least difunctional so that two or more of the carboxylic acid end capped polybutadiene molecules will react with one molecule of the chain extender, i.e. an equivalent weight of carboxylic end capped polybutadiene reacts with an equivalent weight of the chain extender. While chain extenders may be any aromatic or aliphatic compound meeting the above specified criteria, a few of the more suitable chain extenders are alkylene diepoxide, cycloalkylene diepoxide, alkoxyarylene diepoxide, arylene diepoxide, alkycycloalkylene diepoxide, cycloalkene diepoxide, alkenecycloalkylene diepoxide, alkylene diimine, arylene diimine, alkyarylene diimine, arylene diamine, arylalkylenimine, alkylenimine, alkarylene diamine, oxyarylene diamine, cycloalkylene diol, alkylene diol, cycloalkylalkylene diol, aralkylene diol, and arylene diol.

Examples of diepoxide chain extenders in which the unmodified epoxide groups are functionally active and suitable for the present invention are:

TABLE III 1. epoxy novalacs
2. bis-epoxydicyclopentyl ether of ethylene glycol
3. epichlorohydrin/bis phenol A-type
4. 1-epoxyethyl-3,4-epoxycyclohexane
5. dicyclopentadiene dioxide
6. limonene dioxide
7. bis(2,3-epoxypropoxy)benzene
8. vinylcyclohexane dioxide
9. 3,4-epoxy-6-methylcyclohexylmethyl-3,4-epoxy-6-methylcyclohexanecarboxylate
10. zeaxanthin diepoxide
11. 9,10-epoxy-12-hydroxyoctadecanoic acid triester with glycerol Suitable diimine, diimide, triimide, diamine, and diaziridine chain extenders include the following:

TABLE IV 1. 1,6-hexane,N,N'-diethylenimine
2. 1,6-hexane,N,N'-dipropylenimine
3. 1,7-heptane,N,N'-diethylenimine
4. 1,7-heptane,N.N'-dipropylenimine
5. 1,8-octane,N.N'-diethylenimine
6. 1,8-octane,N.N'-dipropylenimine
7. 1,3,di-(carboxy-N-propylenimide) benzene
8. 1,3,5-tri(carboxy-N-propylenimide benzene
9. 1,3,d-(ethylene-N-1,2-butylimine)benzene
10. phthaldiamide
11. benzidine
12. phenylene diamine
13. tolylene diamine
14. tolidine
15. oxydianiline
16. methylene dianiline
17. diamino diphenyl sulfone
18. diphenylethylenimine
19. dimethylethylenimine
20. diethylethylenimine
21. diaminodiphenyl propane Suitable diols include the following:

TABLE V 1. cyclohexandimethanol
2. ethanediol
3. propane diol
4. pentane diol
5. cyclopentadiol
6. phenylenedimethanol
7. phenylenediethanol
8. hydroquinone The peroxide free radical initiator may be incorporated into the chain extender elastomer in either of two ways: in one way the peroxide may be milled into the elastomer after the chain extension step, while in an alternative method the peroxide may be incorporated into the liquid polydiene prior to chain extension. Either method effects the same end result, viz, a chain extended elastomer having the peroxide free radical initiator homogeneously dispersed therethrough substantially unreacted, however, preference may depend upon the processing equipment available. The amount of peroxide employed is generally in the range of between approximately 0.5 – 10% by weight of the polymer, however, these amounts are not too critical, inasmuch as amounts of peroxide above 10% will be operative, however, such large amounts of peroxide are undesirable from an economic standpoint. Amounts of peroxide below 0.5% will effect a reaction, however, the reaction is usually sluggish and sometimes the product does not have the optimum properties attainable. Other factors dependent upon the amount of peroxide used may be the particular peroxide compound used, the polydiene, the anhydride, and the chain extenders selected for the reaction. Approximately 0.5 % to 2% by weight of the polymer are the amounts generally preferred for the peroxide. Thus, when the peroxide is heated in the range of approximately 300° to 425°F the peroxide is activated and the elastomer is cured to a very hard thermoset resin having a shrinkage of less than 7 mils per inch and improved machinability. Organic peroxide free radical initiators suitable for use in this process may be selected from the following:

TABLE VI 1. di-t-butyl peroxide
2. 2,5-dimethyl-2,5-bis(tertiary butylperoxy) hexane
3. n-butyl-4,4-bis(tertiary butylperoxy) valerate
4. 2,5-bis(tertiary butylperoxy) hexyne-3
5. tertiary-butyl perbenzoate
6. dicumyl peroxide
7. methyl ethyl ketone peroxide
8. cumene hydroperoxide
9. di-N-methyl-t-butyl percarbamate
10. lauroyl peroxide
11. acetyl peroxide
12. decanoyl peroxide
13. t-butyl peracetate
14. t-butyl peroxyisobutyrate The idealized overall reaction for the preparation of resins of this invention using 1,2-polybutadienediol, tetrahydrophthalic anhydride, and 4,4'-isopropylidenediphenol is as follows:

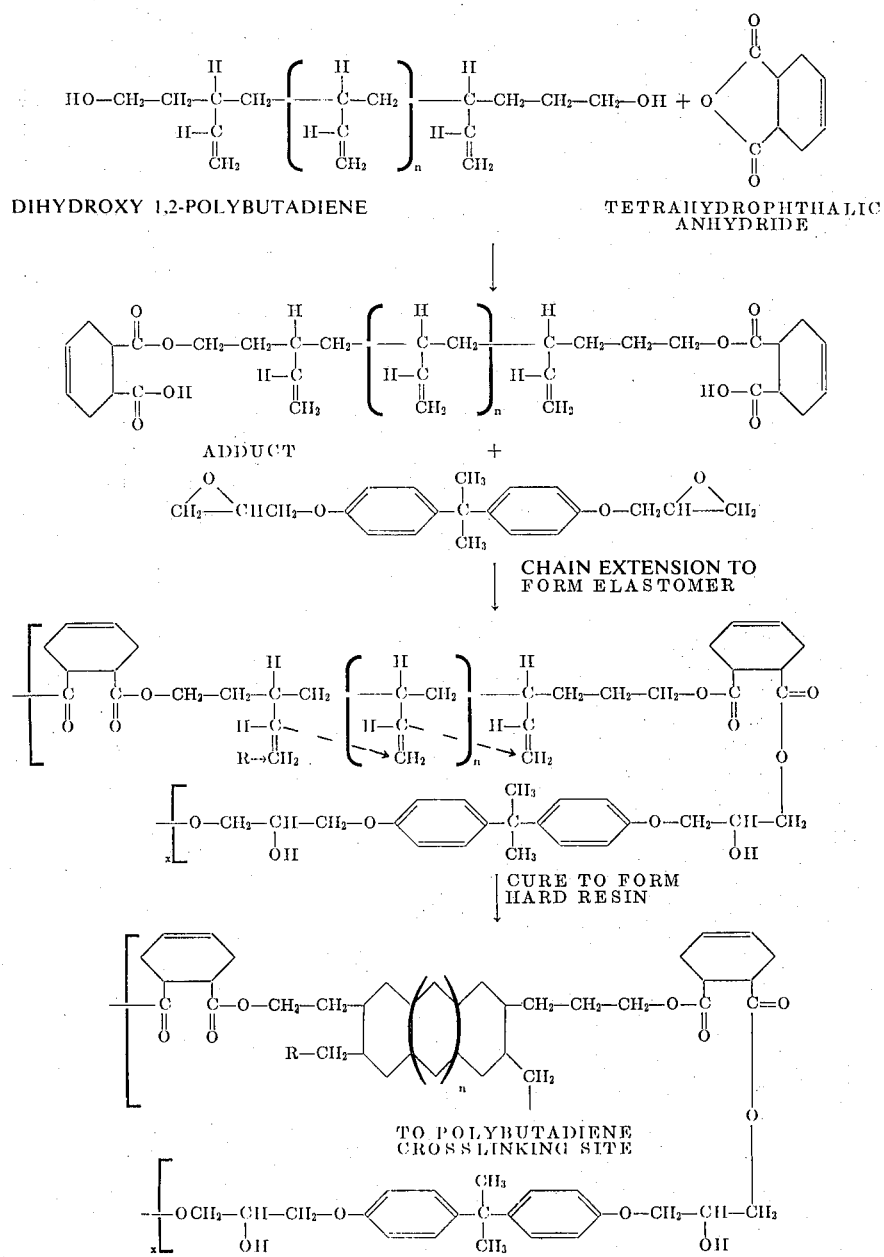

In the first reaction between the polybutadienediol and the anhydride, the functionally active hydroxyl terminal groups on the polybutadiene react with the anhydride to form a dicarboxylic acid adduct. When the epichlorohydrin/bisphenol-A is reacted with the adduct, the adduct is chain extended whereby an elastomer is formed. With the application of heat in the third reaction, the peroxide initiator decomposes to provide a free radical which promotes the cyclization of the pendent vinyl groups of the polydiene and the cross-linking of adjacent chains. In the foregoing equation, $n$ typically represents an integer sufficiently high to provide an average molecular weight corresponding to the polydiene used, preferably in a range of 500 to 5,000, although up to 20,000 can be used, and $x$ is a sufficiently high integer to provide a hard, cross-linked product.

The following examples are presented to illstrate the various features of the invention, and are not intended to be limiting.

EXAMPLE I

Approximately 89,1 grams of 1,2-polybutadienediol and approximately 10.0 grams of tetrahydrophthalic anhydride were combined in a 500 ml kettle fitted with a mechanical stirrer, a thermometer, a heating mantle, and a nitrogen inlet. The pot was heated to 102°C under nitrogen and stirred rapidly for 1 ½ hours under a nitrogen blanket. The finished mixture was degassed and cooled, then approximately 4.0 grams of dicumyl peroxide was added to the resin kettle at 60°C and stirred for 5 minutes followed by addition of approximately 1.2 grams of triethylenediamine and an additional stirring for 5 minutes. Finally, approximately 5 grams of alicyclic diepoxy carboxylate (CY–179, CIBA Industries) was added to the mixture and stirred for 30 minutes. The resin kettle contents were degassed, cast into a crystallizing dish coated with mold release, and covered with aluminum foil. The sample was then placed in an oven which was programmed as follows:

| TEMPERATURE (°C) | TIME (HOURS) |
| --- | --- |
| 90 | 16 |
| 120 | 6 |
| 130 | 16 |
| 140 | 6 |
| 170 | 16 |

The casting obtained after curing possessed the following properties:

| PROPERTY | TEST DATA |
| --- | --- |
| Tensile Strength, psi, ASTM D638 | 7,300 |
| Elongation, %, ASTM D638 | 4.1 |
| Compressive Strength, psi, ASTM D695 | 29,500 |
| Compressive Modulus, psi, ASTM D695 | 250,000 |
| Deflection, % | 18 |
| Specific Gravity | 1.07 |
| Shrinkage on Curing, % | 3.8 |
| Barcol Hardness | 38 |

EXAMPLE II

Approximately 100.0 grams of 1,2-polybutadienediol and approximately 29.7 grams of chlorendic anhydride were placed in a one liter resin kettle which was fitted with a heating mantle, a mechanical stirrer, a nitrogen inlet, and a thermometer. This mixture was heated to a 130°C with rapid stirring under a nitrogen blanket until all solids were in solution. The opaque solution was degassed to give a viscous, amber colored product. This product was cooled to 60°C, then approximately 16.3 grams of diglycidyl ether of bisphenol-A (D.E.R. 332, Dow Chemical) were added (in a liquified state) to the stirred mixture and stirring was continued for 10 minutes. Then, dicumyl peroxide was added at 60°C and the mixture was stirred for an additional 10 minutes. The contents of the resin kettle were placed in a crystallizing dish, covered with aluminum foil, and placed in an oven programmed according to Example I.

The cured product possessed the following properties:

| PROPERTY | TEST DATA |
| --- | --- |
| Tensile Strength, psi, ASTM D638 | 8,350 |
| Elongation, % ASTM D638 | 3.5 |
| Compressive Strength, psi ASTM D695 | 31,000 |
| Compressive Modulus, psi, ASTM D695 | 320,000 |
| Deflection, % | 20 |
| Specific Gravity | 1.18 |
| Shrinkage | 2.1 |
| Hardness, Barcol | 43 |

Low shrinkage molding compounds may be formulated from the resins of this invention by the incorporation of filler material. While it is preferred to incorporate the filler material into a mixture of the liquid adduct and chain extender prior to chain extending, filler materials can be milled into the resulting elastomer after chain extending if the process equipment is available.

Filler materials, such as silica flour, alumina flour, wood flour, metal particles, metal carbides, and carbon particles may be added in amounts up to 80% by weight of the product without significant reduction in the properties of the final resin product. Molding compounds formulated from these high filler contents may range from a low spiral flow mixture suitable for compression molding to dry, tack-free, granular material.

The following example illustrates the formulation and properties of one molding composition:

EXAMPLE III

Approximately 65.5 grams of 1,2-polybutadienendiol and approximately 34.5 grams of chlorendic anhydride were combined in a one liter kettle fitted with a mechanical stirrer, a thermometer, a heating mantle, and a nitrogen inlet. The pot was heated to 130°C under nitrogen and stirred rapidly until all solids were in solution. The opaque solution was degassed to give a viscous, amber colored product. The contents of the pot were cooled to 60°C and the following ingredients were added in the following order, allowing each ingredient to become thoroughly dissolved or wetted before adding the next ingredient:

| INGREDIENT | WEIGHT, GRAMS |
| --- | --- |
| Dicumyl peroxide | 4.8 |
| Silicone | 2.5 |
| Silica Flour, 325 mesh | 510.0 |
| Calcium stearate | 1.3 |
| Magnesium oxide | 2.0 |
| Diglycidyl ether of bisphenol A (Epon 836, Shell Oil) | 21.2 |

The mixture was stirred for 20 minutes and then placed in an oven heated to 200°F for one hour. The chain extended elastomer was removed and allowed to cool. The chain extended molding compound was then placed in molds and cured for 5 minutes at 350°F.

During curing, the molding compound had an ASTM Cup Flow at 350°F of 3,000 psi and a Hull Spiral Flow of one inch at 350°F and 3,000 psi. Properties of the cured product were determined as follows:

| | |
|---|---|
| Flexural Strength, 75°F | 14 × 10³ psi |
| Flexural Strength, 300°F | 3.8 × 10³ psi |
| Retention at elevated temperature | 27% |
| Flexural Modulus, 75°F | 2.6 × 10⁶ psi |
| Flexural Modulus, 3000°F | 0.54 × 10⁶ psi |
| Retention at elevated temperature | 21% |
| Barcol Hardness, 75°F | 81 |
| Mold Shrinkage | 5.8 mils/inch |

The resin of this invention is also suitable for the manufacture of high quality laminates. Silane coated glass fabric which was coated with the reaction product of 1,2-polybutadienediol-pyromellitic dianhydride adduct and an epoxy chain extender produced laminates having a flexural strength of about 78 × 10³ pis. Strength retention was 74% when exposed to 300°F and was 87% after water boil. As a comparison, glass fabric coated with the reaction product of 1,2-polybutadiene-diol-trimellitic anhydride adduct and an epoxy chain extender produced laminates having a flexural strength of 110 × 10³ psi and a flexural modulus of 4.6 × 10³ psi. Strength retension was 100% after water boil and was 40% when exposed to 300°F. Other reinforcing materials which are suitable for laminates or fillers may be selected from carbon fibers,, silica fibers, and metal whiskers.

These new resins are thermally stable at temperatures of 400°C; they are tough, resistant to impact, machinable, and possess a low mold shrinkage. The thermally stable, "stiff" character of the new resins is attributed to the postulated fused cyclic configuration of the polydiene polymer chain between chemical crosslinks. Other properties of the new resins are attributed to the adduct formation and subsequent chain extension of the polydiene. All of these advantages are achieved with materials having a relatively high hydrocarbon content.

I claim:

1. A hard thermoset resin which is a reaction product of the ratio of (1) one equivalent of a polydiene having (i) polyfunctional groups selected from the group consisting of hydroxyl, amino, and mercapto, and (ii) a predominant amount of pendant vinyl groups on alternate carbon atoms of the polydiene backbone; (2) one gram mole of a carboxylic acid adduct forming aliphatic or aromatic acid anhydride capable of reacting with the polyfunctional groups of the polydiene; (3) one equivalent of a polyfunctional aliphatic or aromatic chain extender capable of reacting with the carboxylic acid adduct; and (4) a peroxide free radical initiator.

2. A hard thermoset resin according to claim 1 wherein the polydiene is selected from the group consisting of 1,2-polybutadiene and 3,4-polyisoprene.

3. A hard thermoset resin according to claim 1 wherein the acid anhydride is selected from the group consisting of trimellitic anhydride, tetrahydrophthalic anhydride, hexahydrophthalic anhydride, chlorendic anhydride, nadic anhydride, maleic anhydride, oxalic anhydride, succinic anhydride, malonic anhydride, suberic anhydride, azelaic anhydride, sebacic anhydride, adipic anhydride, glutaric anhydride, pimelic anhydride and phthalic anhydride.

4. A hard thermoset resin according to claim 1 wherein said chain extender is selected from the group consisting of alkylene diepoxide, cycloalkylene diepoxide, alkoxyarylene diepoxide, arylene diepoxide, alkylcycloalkylene diepoxide, cycloalkene diepoxide, alkenecycloalkylene diepoxide, alkylene diimine, arylene diimine, alkarylene diimine, arylene diamine, arylalkylenimide, alkylenimine alkarylene diamine, oxyarylene diamine, cycloalkylene diol, cycloalkylalkylene diol, aralkylene diol, alkylene diol, and arylene diol.

5. A hard thermoset resin according to claim 1 wherein the acid anhydride is selected from the group consisting of 3,3',4,4'-benzophenone tetracarboxylic dianhydride, polyazelaic polyanhydride, pyromellitic dianhydride, 1,2,3,4-cyclopentane tetracarboxylic dianhydride, and endo-cis bicyclo (2.2.1.)-5-heptane-2,3-dicarboxylic dianhydride.

6. A thermosetting elastomeric polymer comprising a reaction product of the ratio of (1) one equivalent of a polydiene having (i) polyfunctional groups selected from the group consisting of hydroxyl, amino, and mercapto and (ii) a predominant amount of pendant vinyl groups on alternate carbon atoms of the polydiene backbone; (2) one gram mole of a carboxylic acid adduct forming aliphatic or aromatic acid anhydride capable of reacting with the polyfunctional groups of the polydiene; (3) one equivalent of a polyfunctional aliphatic or aromatic chain extender capable of reacting with the carboxylic acid adduct; and (4) a peroxide free radical initiator homogeneously dispersed throughout the reaction product.

7. A thermosetting elastomeric polymer according to claim 6 wherein the polydiene is selected from the group consisting of 1,2-polybutadiene and 3,4-polyisoprene.

8. A thermosetting elastomeric polymer according to claim 6 wherein the acid anhydride is selected from the group consisting of trimellitic anhydride, tetrahydrophthalic anhydride, hexahydrophthalic anhydride, tetrachlorophthalic anhydride, tetrabromophthalic anhydride, chlorendic anhydride, nadic anhydride, maleic anhydride, oxalic anhydride, succinic anhydride, malonic anhydride, suberic anhydride, azelaic anhydride, sebacic anhydride, adipic anhydride, glutaric anhydride, pimelic anhydride, and phthalic anhydride.

9. A thermosetting elastomeric polymer according to claim 6 wherein said chain extender is selected from the group consisting of alkylene diepoxide; cycloalkylene diepoxide; alkoxyarylene diepoxide; arylene diepoxide; alkylcycloalkylene diepoxide; cycloalkene diepoxide; alkenecycloalkylene diepoxide; alkylene diimine; arylene diimine; alkarylene diimine; arylene diamine; arylalkylenimine; alkylenimine alkarylene diamine; oxyarylene diamine; cycloalkylene diol; cycloalkylalkylene diol; aralkylene diol; alkylene diol; and arylene diol.

10. A thermosetting elastomeric polymer according to claim 6 wherein the acid anhydride is selected from the group consisting of 3,3',4,4'-benzophenone tetracarboxylic dianhydride, polyazelaic polyanhydride, pyromellitic dianhydride, 1,2,3,4-cyclopentane tetracarboxylic dianhydride, and endo-cis bicyclo (2.2.1.)5-heptene-2,3-dicarboxylic dianhydride.

11. A method of producing a hard thermoset polydiene resin comprising:

A. reacting by ratio (1) one equivalent of a polydiene having (i) polyfunctional groups selected from the group consisting of hydroxyl, amino, and mercapto and (ii) a predominant amount of pendant vinyl groups on alternate carbon atoms of the polydiene backbone with (2) one gram mole of an aliphatic or aromatic acid anhydride capable of reacting with the polyfunctional groups of the polydiene to form a carboxylic acid terminated adduct;

B. mixing the polydiene carboxylic acid terminated adduct with (3) a peroxide free radical initiator and (4) one equivalent of an aliphatic or aromatic chain extender capable of reacting with the adduct;

C. reacting the adduct and the chain extender to form an elastomeric polymeric material having the peroxide initiator homogeneously dispersed therethrough substantially unreacted; and D. subsequently curing the elastomer to a hard thermoset resin.

12. A method according to claim 11 wherein the polydiene is selected from the group consisting of 1,2-polybutadiene and 3,4-polyisoprene.

13. A method according to claim 11 wherein the acid anhydride is selected from the group consisting of trimellitic anhydride, tetrahydrophthalic anhydride, hexahydrophthalic anhydride, tetrachlorophthalic anhydride, tetrabromophthalic anhydride, chlorendic anhydride, nadic anhydride, maleic anhydride, oxalic anhydride, succinic anhydride, malonic anhydride, suberic anhydride, azelaic anhydride, sebacic anhydride, adipic anhydride, glutaric anhydride, pimelic anhydride, and phthalic anhydride.

14. A method according to claim 11 wherein said chain extender is selected from the group consisting of alkylene diepoxide, cycloalkylene diepoxide, alkoxyarylene diepoxide, arylene diepoxide, alkylcycloalkylene diepoxide, cycloalkene diepoxide, alkenecycloalkylene diepoxide, alkylene diimine, arylene diimine, alkarylene diimine, arylene diamine, arylalkylenimine, alkylenimine, alkarylene diamine, oxyarylene diamine, cycloalkylene diol, cycloalkylalkylene diol, aralkylene diol, alkylene diol, and arylene diol.

15. A method according to claim 11 wherein the acid anhydride is selected from the group consisting of 3,3',4,4'-benzophenone tetracarboxylic dianhydride, polyazelaic polyanhydride, pyromellitic dianhydride, 1,2,3,4-cyclopentane tetracarboxylic dianhydride, and endo-cis bicyclo (2.2.1)-5-heptene-2,3-dicarboxylic dianhydride.

* * * * *